S. PYTLEWSKI.
REINFORCED TREAD FOR SPRING WHEELS.
APPLICATION FILED APR. 11, 1919.

1,327,843.

Patented Jan. 13, 1920.
2 SHEETS—SHEET 1.

INVENTOR
Steve Pytlewski
BY
ATTORNEY

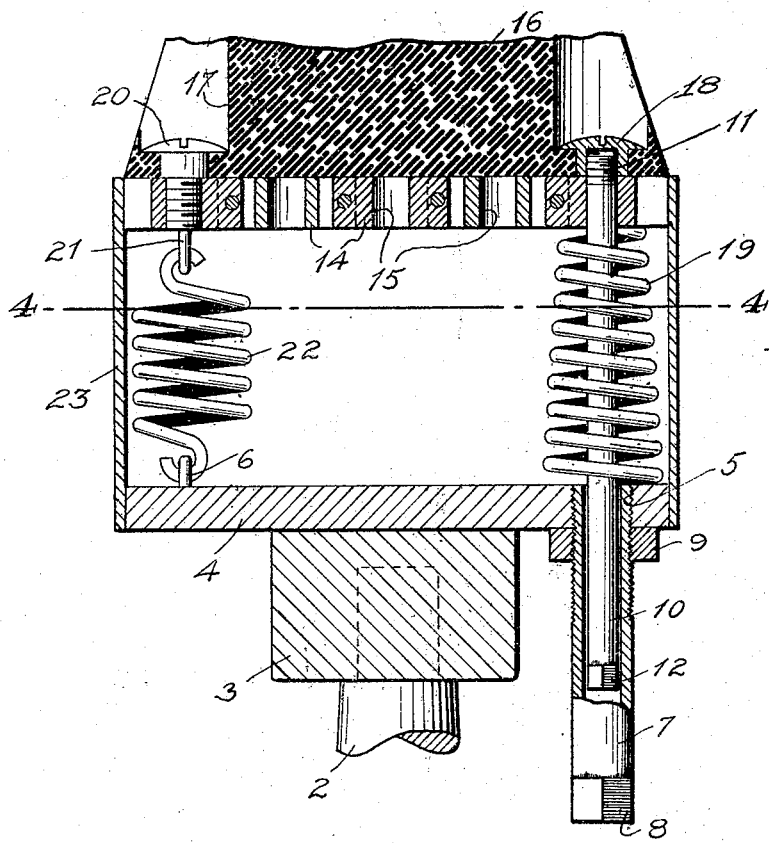
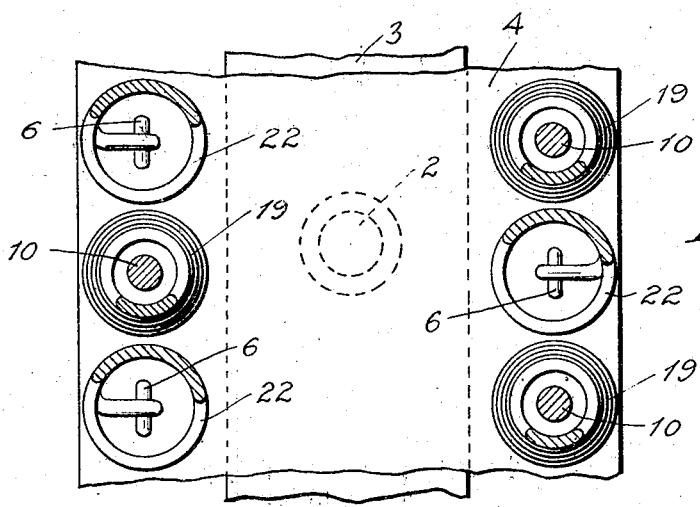

UNITED STATES PATENT OFFICE.

STEVE PYTLEWSKI, OF MINNEAPOLIS, MINNESOTA.

REINFORCED TREAD FOR SPRING-WHEELS.

1,327,843.     Specification of Letters Patent.     Patented Jan. 13, 1920.

Application filed April 11, 1919. Serial No. 289,353.

*To all whom it may concern:*

Be it known that I, STEVE PYTLEWSKI, a citizen of Russia, residing at Minneapolis, county of Hennepin, and State of Minnesota, have invented certain new and useful Improvements in Reinforced Treads for Spring-Wheels, of which the following is a specification.

This invention relates to new and useful improvements in cushion wheels, and the principal object thereof is to afford means to provide easy and smooth riding in motor vehicles without the use of the ordinary inflatable tire.

Another object of the invention is in the provision of a non-puncturable structure which retains the riding qualities of pneumatic tires and combines therewith the advantages of the solid tires.

A further object of the invention is to provide a tire or cushion wheel containing a mat to which a solid rubber tire may be secured, the mat being supported on suitable springs in spaced relation to the wheel felly so that the tread of the wheel is supported on a cushioning surface which will absorb vibration and shocks incident to traveling in a motor car.

As a still further object the invention contemplates the provision of means for inclosing the working elements in order to render the wheel dust and moisture proof.

With the above and other objects in view, the invention consists in the details of construction, combination and arrangement of parts which will be hereinafter fully set forth, described and illustrated in the accompanying drawings, in which—

Fig. 3 is an enlarged transverse sectional view of the wheel felly, rim and mat structure, taken on line 3—3 of Fig. 1, and Fig. 4 is a sectional view taken on line 4—4 of Fig. 3.

Figure 1:
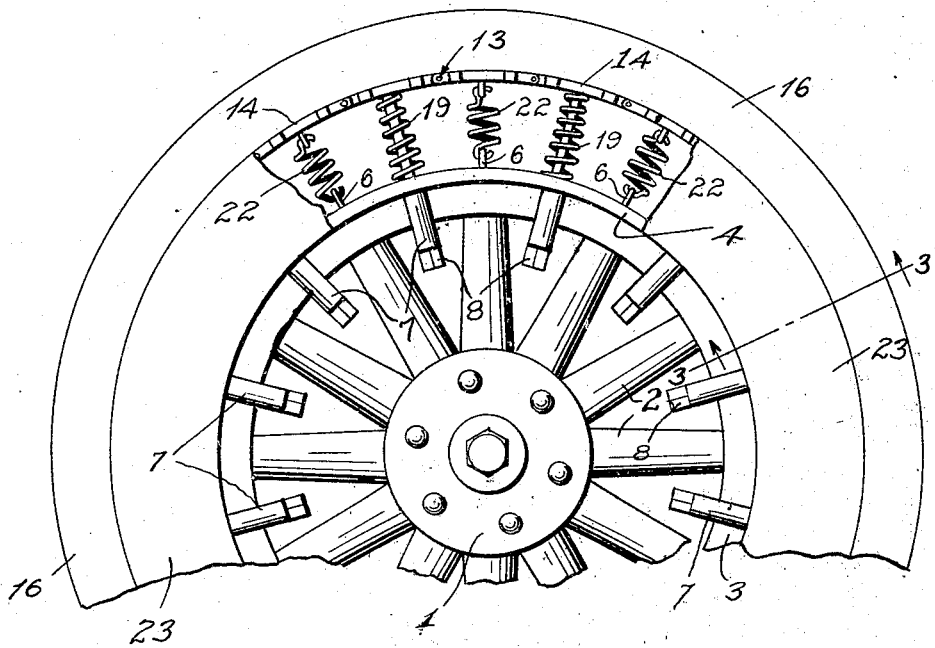
Figure 1 is a fragmentary side view of a wheel constructed in accordance with this invention, showing a portion of the covering broken away to illustrate the interior construction.

Referring to the drawings, the numeral 1 designates the hub of a wheel of the ordinary type which is provided with radiating spokes 2. These spokes support at their outer ends the usual felly 3, to which a metallic rim 4 is secured, in any suitable manner, and is provided near each of the side edges with a plurality of spaced internally screw threaded openings 5, and intermediate such spaced openings are eyes 6 which extend outwardly from the periphery of the rim, and are provided for a purpose to be more fully described.

Inserted into the threaded openings 5, are tubular sleeves 7, having their extending ends 8 squared, the screw-threaded portions having upon them lock nuts 9, by means of which the sleeves are prevented from becoming loosened after having been placed in the rim.

Slidably mounted in the sleeves 7, are plungers 10 the outer ends of which are threaded as at 11, while their extending ends are provided with rectangular portions 12, as illustrated in Fig. 3.

The rectangular portions 8 and 12, on the sleeves and plungers 7 and 10 respectively, are provided to enable the ready removal of these parts when it is necessary that repairs be made to the wheel.

Figure 2:
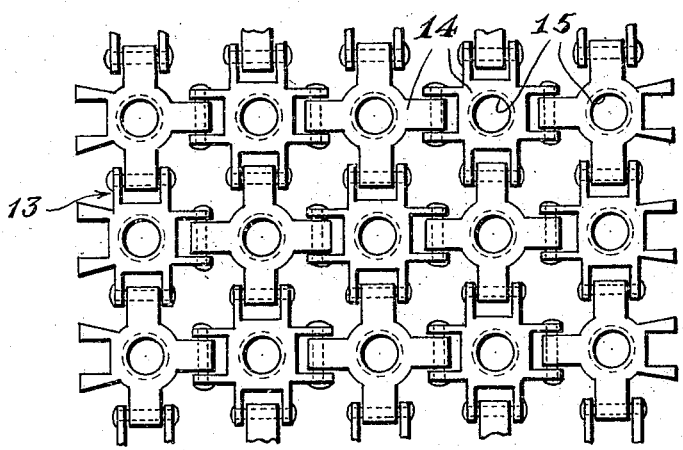
Fig. 2 is a fragmentary plan view of the mat upon which the tread is secured.

A mat, illustrated in Fig. 2 and designated generally by the numeral 13, consists of a plurality of links 14, provided with internally screw threaded openings 15, which are hingedly connected together by rivets so as to form a flexible chain which is capable of being bent around the felly or rim of the wheel upon which the device is used, as illustrated in Fig. 1.

The mat 13 is designed to support the tread or tire 16, which is provided at spaced intervals, near its edges, with openings 17 through which the securing bolts or screws 20 extend. As illustrated in Fig. 4 the plungers 10 and sleeves 7 are spaced in the rim in such manner that the threaded ends 11 of said plungers will extend through the openings 15, of the outside links of the mat 13 alternately.

Threaded on the ends 11 of the plungers 10 are headed screw-sockets 18 which pass through the openings 17 in the tread 16 as is clearly illustrated in Fig. 3, and these screws provide a means for securing the tread on the mat and the mat on the wheel. Interposed between the rim 4 and mat 13, are taper coiled compression springs 19 and it will be seen that when the wheel strikes any irregularity on the roadway one of the plungers 10 will be depressed and the springs will absorb the vibration.

In order to limit the outward movement of the mat 13 and tread or tire 16, the screws or bolts 20 having eyes 21 on the inner ends are threaded through the mat, intermediate the plungers 10, and attached to the eyes 21 are retractile coiled springs 22, the inner ends of which are attached to the eyes 6 before mentioned. It will be noted that the sockets 18 and bolts 20 are provided with relatively large heads which engage the tire 16 and hold the same in place on the mat.

In order to exclude dust from the interior of the wheel, between the mat and rim, there are provided flexible screens 23 which are secured to opposite sides of the rim and mat in any suitable manner.

In operation, it will be seen that the driving power of the motor and traction of the vehicle on which the device is used, is transmitted to the wheel in the usual manner and then to the rim 4, this power is then transmitted by means of plungers 10 to the mat 13, which in turn, rotates the tread or tire 16, so as to drive the vehicle.

In event that a stone or other rough object is encountered in the roadway, it will be evident that the mat will bend or buckle against the pressure of the springs 19, which will take up the shock and vibration, thus avoiding the transmission of the same to the occupants of the vehicle.

Should it be necessary at any time to make repairs, it is apparent that by the removal of one or the other of the screens 23 access to the interior may be had. It will also be evident that should a plunger, or any element associated therewith, become broken or otherwise unfit for use, the same may be readily replaced by the loosening of the nuts 9 and unscrewing the sleeve 7 from the rim 4 by applying a wrench to the square portion 8. It will be evident that the square portion 12 of the plunger may be used in a similar manner when it is desired to remove the same from its position in the mat 13.

While from the foregoing there has been shown and described the preferred embodiment of this invention, it is to be understood that changes in the construction, combination and arrangement of parts may be resorted to as will fall within the spirit of the invention as claimed.

What is claimed is—

1. In a cushion wheel, the combination with a rim and a flexible tread, of a mat interposed between said rim and tread, securing elements extending through the tread, plungers rigidly engaged in certain of said securing elements, and extending through said mat, and a plurality of compression springs between said rim and mat, said springs encircling said plungers.

2. In a cushion wheel, a rim, a plurality of plungers slidably mounted in said rim, coiled compression springs surrounding said plungers, a mat supported on said springs at the outer ends of the plungers, a tread surrounding said mat, and means extending through said tread and attached to the plungers for securing the mat, tread and plungers in position.

3. In a tire of the class described, the combination with a rim, and a flexible tread circumjacent thereto, of a plurality of mat elements pivotally engaged together abutting against said tread, securing elements having enlarged heads engaged in certain of said mat elements and extending therethrough, rods rigidly engaged with certain of said mat elements, said rods extending through said rim, and a plurality of compression springs extending between said rim and said mat elements.

4. In a tire of the class described, the combination with a rim, and a flexible tread circumjacent thereto, of a plurality of metallic link elements pivotally engaged one with the other and abutting the inner surface of said tread for constituting a mat, means engaged in said link elements, slidable in said rim, springs interposed between said rim and mat, and tension springs engaging said mat and the periphery of said rim.

5. In a tire, the combination with a rigid annular rim, and a flexible tread, of a metallic mat disposed on the inner side of said tread, securing elements having enlarged heads extending through said tread, plungers extending through the mat engaged with said tread, said plungers being movably mounted in said securing elements, springs surrounding said plungers and yieldably holding said mat and said rim in spaced relation, and coiled retractile springs for limiting the outward movement of said mat and tread relative to the rim.

In testimony whereof I have affixed my signature.

STEVE PYTLEWSKI.